Sept. 7, 1943.  E. O. HAMREN  2,328,553
TUMBLING BARREL
Filed April 7, 1941  9 Sheets-Sheet 1

Inventor
Eric O. Hamren

Attorney

Sept. 7, 1943.　　　　E. O. HAMREN　　　　2,328,553
TUMBLING BARREL
Filed April 7, 1941　　　9 Sheets-Sheet 2
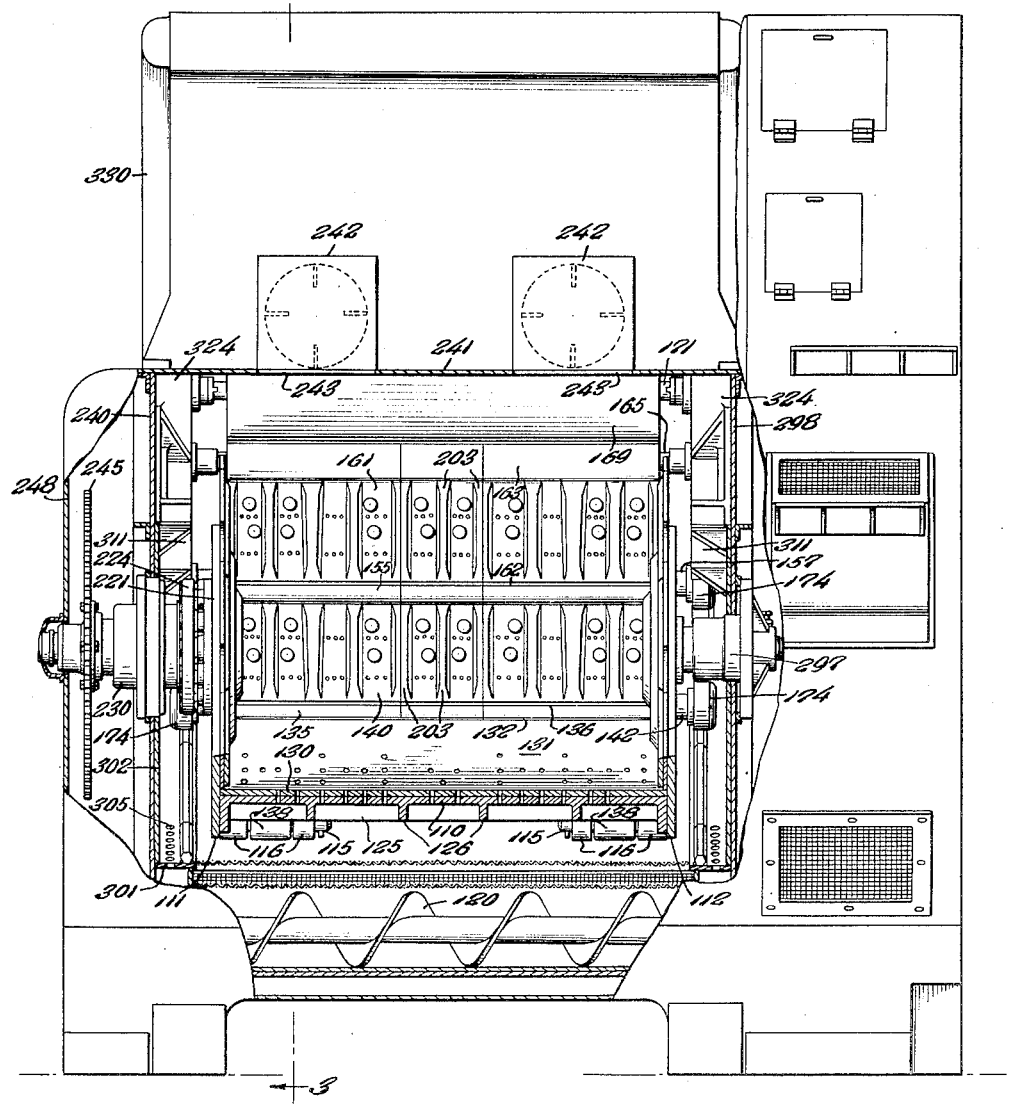
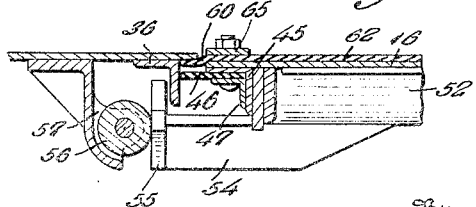
Inventor
Eric O. Hamren Sept. 7, 1943.  E. O. HAMREN  2,328,553
TUMBLING BARREL
Filed April 7, 1941   9 Sheets-Sheet 3

Inventor
Eric O. Hamren
By Spear, Donaldson Hall
Attorney

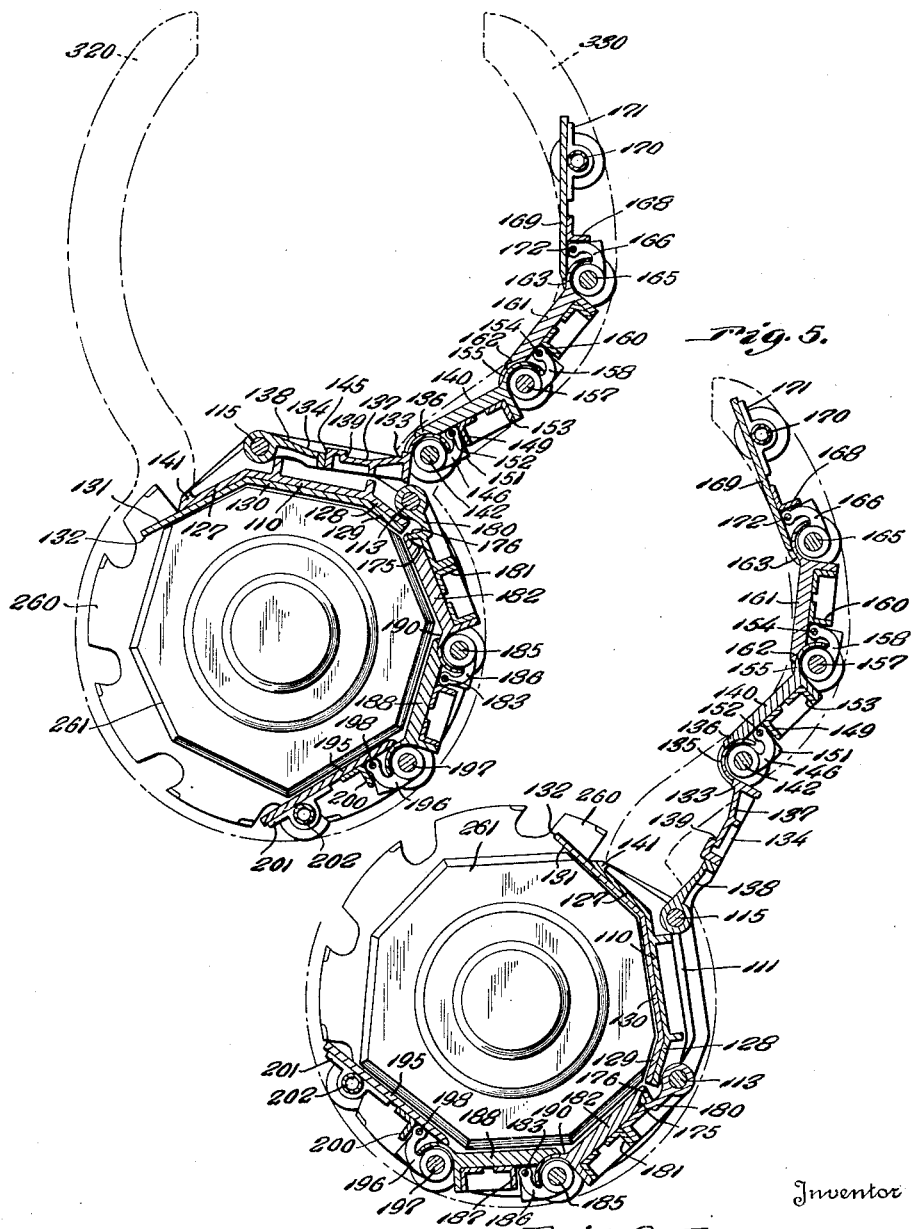

Sept. 7, 1943.  E. O. HAMREN  2,328,553
TUMBLING BARREL
Filed April 7, 1941  9 Sheets-Sheet 5
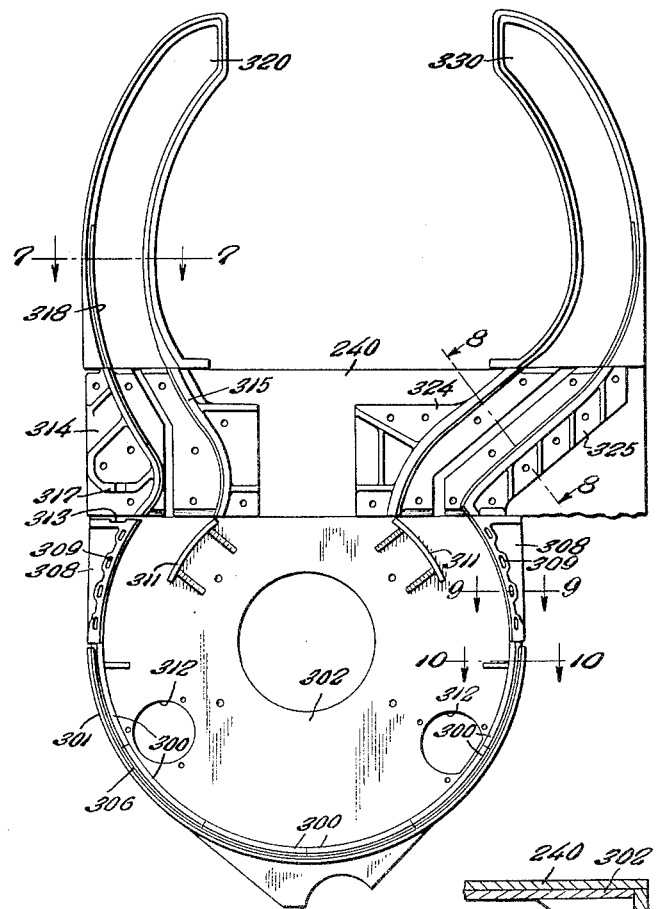
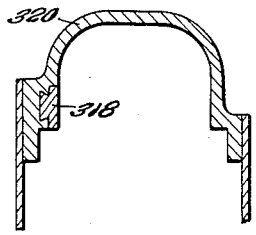
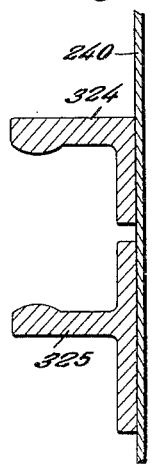

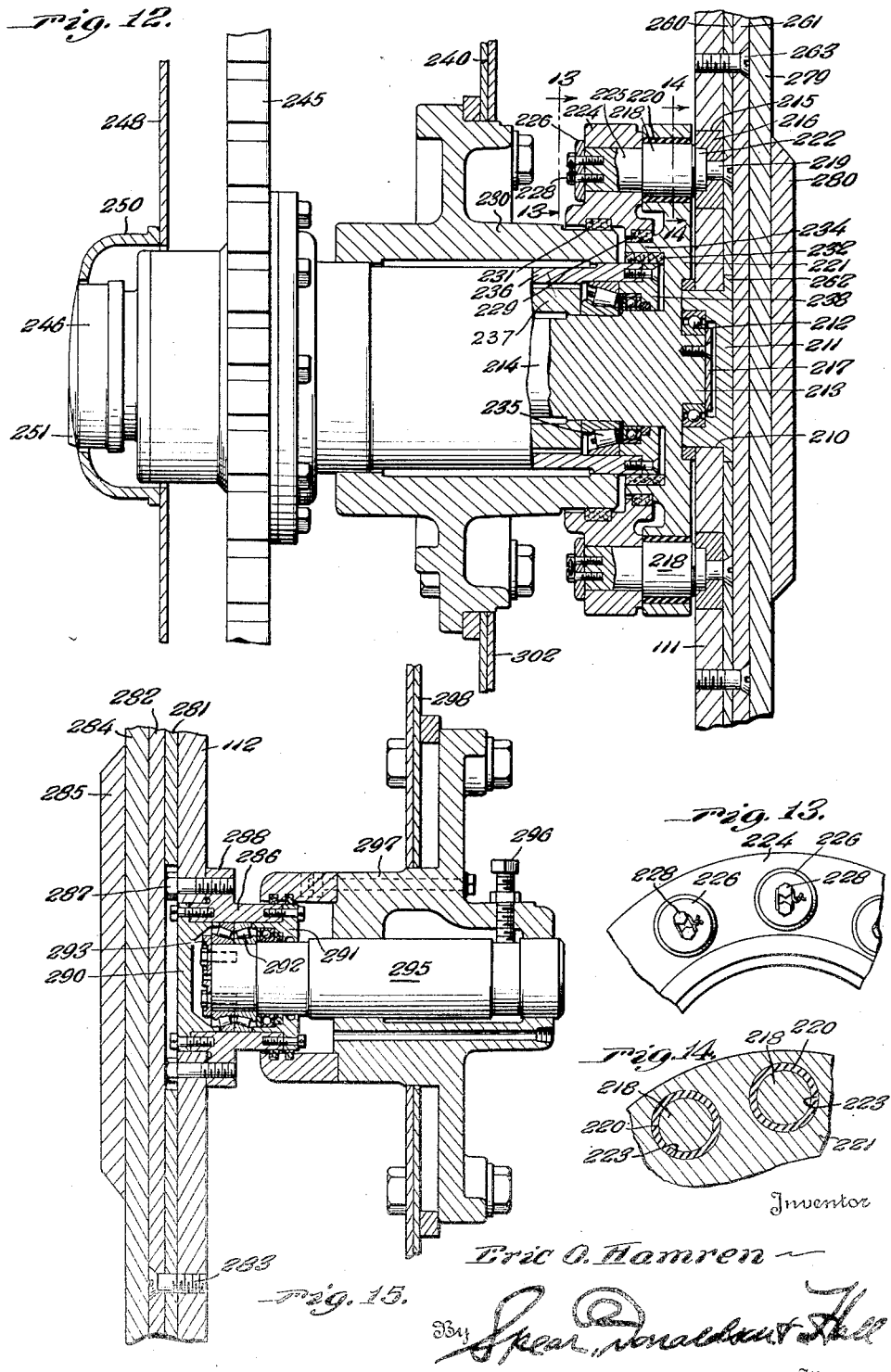

Sept. 7, 1943.  E. O. HAMREN  2,328,553
TUMBLING BARREL
Filed April 7, 1941   9 Sheets-Sheet 7

Inventor
Eric O. Hamren
By [signature]
Attorney

Sept. 7, 1943.  E. O. HAMREN  2,328,553
TUMBLING BARREL
Filed April 7, 1941   9 Sheets-Sheet 8

Inventor
Eric O. Hamren
By Spear, Donaldson & Hall
Attorney

Sept. 7, 1943.  E. O. HAMREN  2,328,553
TUMBLING BARREL
Filed April 7, 1941  9 Sheets-Sheet 9
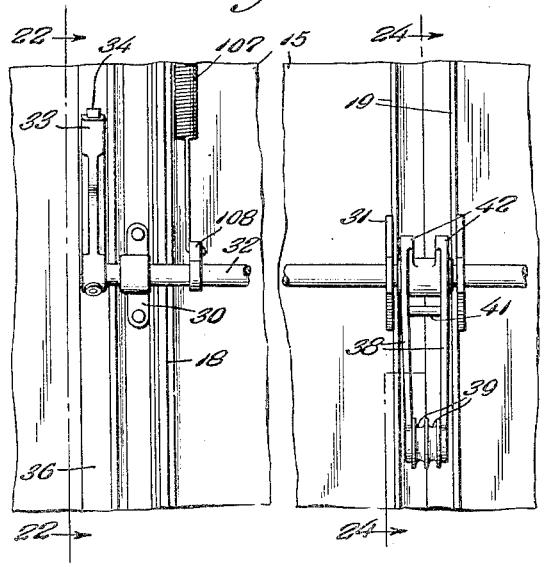
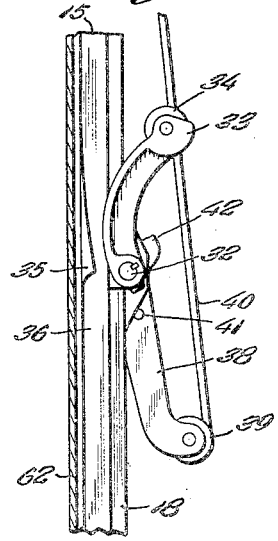
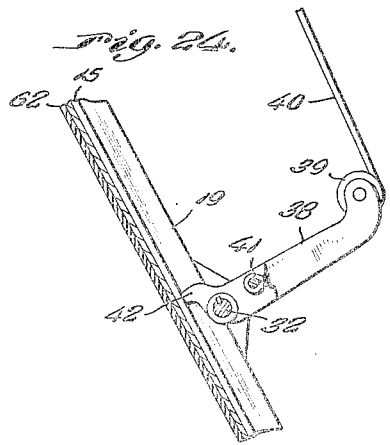
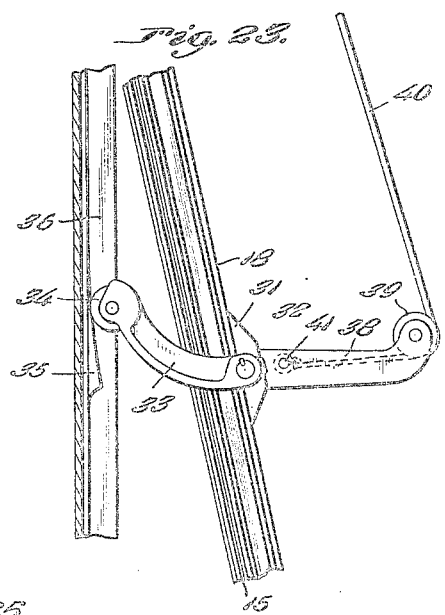

Patented Sept. 7, 1943

2,328,553

UNITED STATES PATENT OFFICE 2,328,553

TUMBLING BARREL

Eric O. Hamren, Hagerstown, Md., assignor to Pangborn Corporation, Hagerstown, Md., a corporation of Maryland Application April 7, 1941, Serial No. 387,315

12 Claims. (Cl. 51—9)

This invention relates to tumbling barrels, and more particularly to a machine of this character which employs a conveyor which is moved back and forth in a general trough shaped path in order to turn the material on the conveyor over and over in opposite directions. A machine of this general construction is disclosed and claimed in an application of Eric O. Hamren, Serial No. 154,105, filed on July 16, 1937, now Patent No. 2,254,219.

The machine of the present invention provides in such a machine a conveyor and associated elements which are of simpler construction. Because of the fewer parts which are required, the machine is of less expensive construction and will have a longer operating life.

As a further feature of the invention, power operated door opening means are provided.

Another feature of the invention is the provision of means for driving the conveyor which will be of strong construction and not liable to breakage from shocks which arise in operation.

Other features will appear from the following description when considered in connection with the accompanying drawings, in which Figure 1 is a perspective view of a machine embodying my invention.

Fig. 2 is a front elevation of the machine with a portion of the front broken away and certain parts of the tumbling barrel shown in section.

Fig. 4 is a view similar to Fig. 3 but showing the tumbling barrel in dumping position, the trackway being shown in broken lines.

Fig. 5 is a view similar to Fig. 3 but showing the tumbling barrel in loading position.

Fig. 6 is an elevation of the assembled track sections at one end of the barrel.

Fig. 7 is a detail section on an enlarged scale on the line 7—7 of Fig. 6.

Fig. 8 is a detail section view on an enlarged scale on the line 8—8 of Fig. 6.

Fig. 9 is a detail section view on an enlarged scale on the line 9—9 of Fig. 6.

Fig. 10 is a detail section view on an enlarged scale on the line 10—10 of Fig. 6.

Fig. 12 is an enlarged fragmentary detail section at the driving end of the barrel.

Fig. 13 is a fragmentary detail section on line 13—13 of Fig. 12.

Fig. 14 is a fragmentary detail section on line 14—14 of Fig. 12.

Fig. 15 is an enlarged fragmentary detail section at the idling end of the barrel.

Fig. 17 is a section on line 17—17 of Fig. 1.

Fig. 21 is a fragmentary portion of the door in front elevation showing the cam-like arm for breaking the door seal and its actuating lever to which the lifting cable is secured.

Fig. 22 is a section taken on line 22—22 of Fig. 21.

Fig. 23 is a view similar to Fig. 22, but showing the elements in their operative positions.

Fig. 24 is a sectional view at the line 24—24 of Fig. 21, but showing the actuating lever in its full position for lifting the door.

Fig. 25 is a sectional view on the line 25—25 of Fig. 1.

Figure 1:

The tumbling mechanism is enclosed in a cabinet having a door in the front thereof made up of an upper section 15 and a lower section 16 hinged together at 17. The section 15 is reinforced by angles 18 spaced from and parallel to its outer edges and by central longitudinal angles 19. Welded to the top edge of this door section 15 is a shaft 20, the ends of which project beyond the door and are mounted for rotation in bearings 21 secured to the cabinet.

The lower edge of this door section 15 has secured thereto angle irons 22 and 23 (Fig. 25). The angle 22 serves as a reinforcing strip, while the angle 23 serves as a clamp to secure a sealing strip 24 which engages a similar strip 25 on the upper edge of the lower door section 16. Secured to the angles 18 and the angles 22 at their junctions are lugs 26 having set screws 27 threaded therein. Set screws 27 engage with set screws 28 mounted in a similar manner on the upper edge of the lower door section, and by their adjustment the pivotal movement between the two door sections can be limited to thereby insure a tight fit of the door sections against the cabinet.

Secured to the angles 18 are bearings 30 (Fig. 21) and secured to the angles 19 are bearing plates 31 in which is journaled a shaft 32. The ends of shaft 32 extend beyond the door and have arms 33 secured thereto, and journaled in the free ends of the arms are rollers 34. These arms 33 act as cams to initially open the door when shaft 32 is rotated. The rollers 34 ride on wear plates 35 which are secured to the angles 36 that reinforce the cabinet along the edges of the door opening.

To rotate shaft 32, a bifurcated lever 38 is fixed thereto between the bearing plates 31. A pair of grooved rollers 39 are mounted in the free end of lever 38 and the door lifting cables 40 pass around them and are secured to a cross pin 41 of the lever 38. A projection 42 is formed on this lever for engagement with the face of the angles 19 to limit the upward movement of lever 38, as appears in Fig. 24. The operation of the arms 33 and lever 38 in opening the door will hereinafter be described.

The lower door section 16 has a curved lower portion to conform with the cabinet's curvature. Angle irons 45 reinforce the outer edges of the door section 16 and a sealing strip 46 (Fig. 17) is clamped thereon by a second angle 47. This sealing strip 46 fits snugly against the angle 36 along the door opening of the cabinet. A similar sealing strip (not shown) is secured to the angles 18 at the sides of the upper door section 15. An angle 48 (Fig. 25) secures the sealing strip 25 in place against a reinforcing angle at the upper edge of door section 16.

The lower edge of the door section 16 has a sealing strip 49 (Fig. 3) affixed thereto as are the other sealing strips described. This sealing strip 49 bears against the chute-like bottom portion 50 of the door opening. At the upper edge of door section 15 is affixed a sealing strip 51 (Fig. 3) to bear against the cabinet. The sealing strips around the door and between the door sections form a dustproof seal.

To form a further seal for the door, the entire rear face of the door sections is covered with a sheet of rubber 62. At its edges, this rubber sheet extends beyond the edges of said door, and these projecting edges, as 60 (Fig. 17), bear against the face of the cabinet to form a seal. Thin metal strips 65 are used to secure the rubber cover 62 to the door.

To guide the lower door section 16 in its final closing movement against the cabinet, rollers 56 are mounted in brackets 57 affixed to the cabinet (Fig. 17). These rollers 56 cooperate with guide plates 55 affixed to the ends of supporting arms 54. The arms 54 are secured to an inverted angle 52 which is welded to the face of the lower door section 16 and extends between the angles 45.

Figures 19, 20:
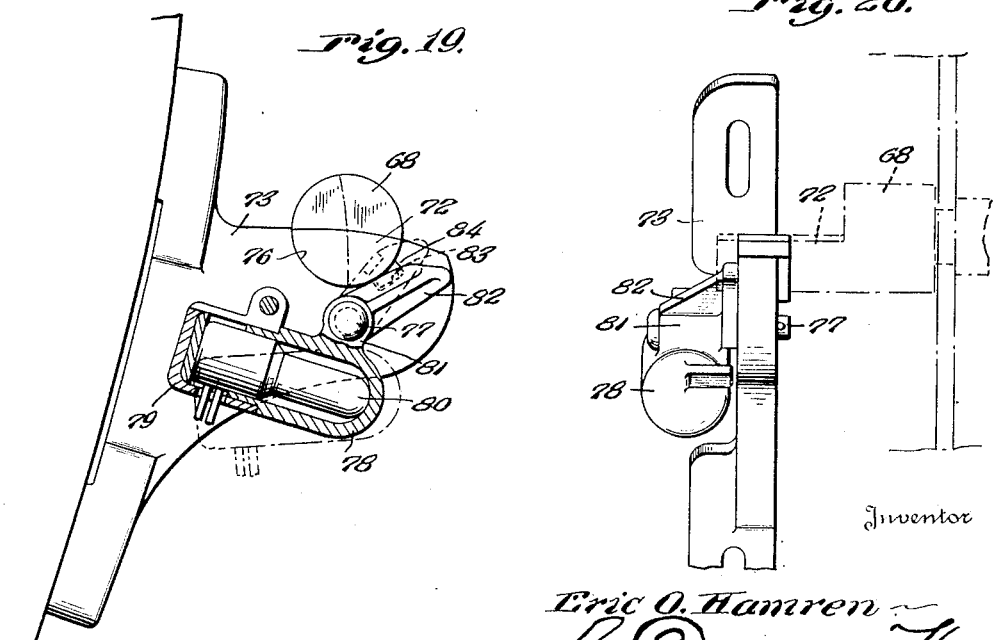
Fig. 19 is an enlarged side elevation of one of the door locking brackets, showing the safety switch mounted thereon.
Fig. 20 is a front elevation of Fig. 19, the door locking bar being shown in dotted lines.

To support the means for locking the door closed, plates 66 are mounted on the angles 45 of the door section 16. These plates form a bearing for the door locking shaft 68. The shaft may be further supported by bearing 69 centrally of its length. Handles 70 are secured to shaft 68 to afford means for manually rotating the shaft. The ends of the shaft 68 extend beyond the door edges and have offset lugs 72 (Figs. 19, 20) secured thereto for engagement with locking brackets 73. The locking brackets 73 are secured to the angles 36 of the cabinet. The lugs 72 are semi-cylindrical in shape, and the brackets 73 have recesses 76 therein to receive the locking lugs. Rotation of shaft 68 carries these offset locking lugs out of the recesses 76, so that the door may be opened.

On this bracket 73 is pivotally mounted a cylinder-like container 78 having a removable cap 79. Inside of this container is an electrical switch 80 which makes or breaks a circuit when tilted, as, for example, the common mercury switch. Formed as part of the cylinder near one end is a boss 81 through which extends a pin 77 carried by the bracket 73, and upon which the container 78 pivots. An arm 82 extends from boss 81 at such an angle as to normally lie in the path of lug 72 when it is rotated. When the offset lug 72 is seated in the recess 76 of the bracket 73, it will also strike the arm 82 and tilt the switch to a broken circuit position, but when the locking lug is rotated to a position out of recess 76, it will allow the switch to assume the position shown in dotted lines in Fig. 19 in which the circuit will be closed. The arm 82 has a projection 83 formed on it which extends into the recess 76. This projection acts as a stop to limit the movement of the switch in a counterclockwise direction when lug 72 is removed from the recess 76, as the projection will strike the far side of the inner face of the recess. A notch 84 in the face of recess 76 will accommodate this projection 83 when the lug is in its locked position.

A panel 90 is mounted at the top of the front part of the cabinet, this panel being supported by uprights 91. Attached to this panel 90 are brackets 92 having bearings 93 secured thereto. Journaled in the bearings 93 is a shaft 94, and affixed to this shaft is a drum 95 having oppositely disposed tapers in which are formed reversely spiraled grooves 96 which terminate with flanges 97 at the end of the drum. Apertures 98 are formed in the flanges 97 for securing the lifting cables 40 thereto. There are two cables 40, and they wind up separately on the opposite sides of the drum 95, toward the center of the drum.

Figures 3, 11:
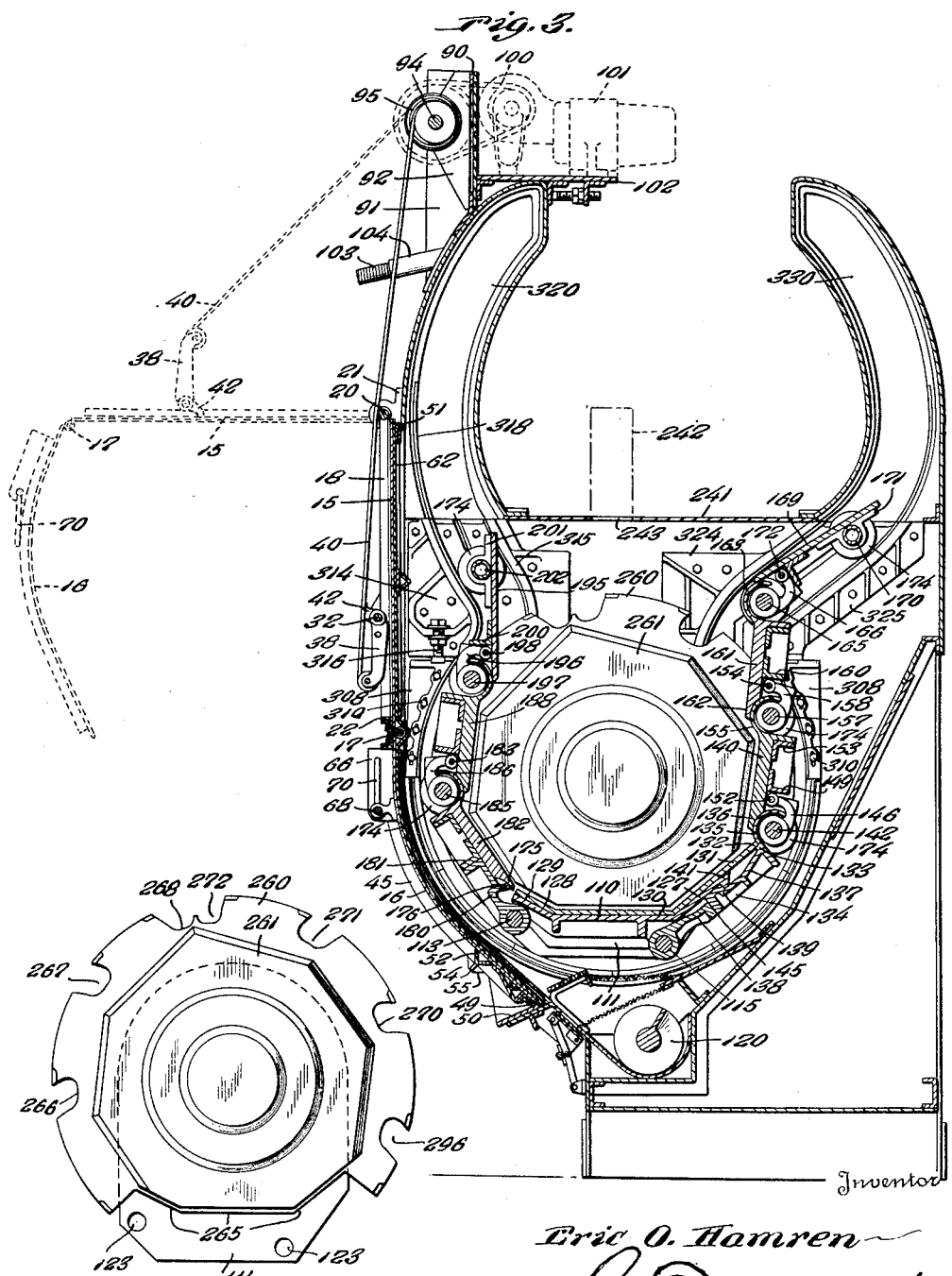
Fig. 3 is a vertical sectional view taken substantially on the line 3—3 of Fig. 2, showing the tumbling barrel in a work tumbling position, and showing the door in broken lines to indicate a partial open position.
Fig. 11 is a face view of the barrel head appearing in Fig. 3 at the driving end of the barrel, the conveyor being entirely removed.

A sprocket 99 is fixed to shaft 94 and is driven through a chain 100 by the motor 101 shown in dotted lines in Fig. 3. The motor 101 is mounted on a platform 102 secured to the rear of the panel 90.

Figure 18:
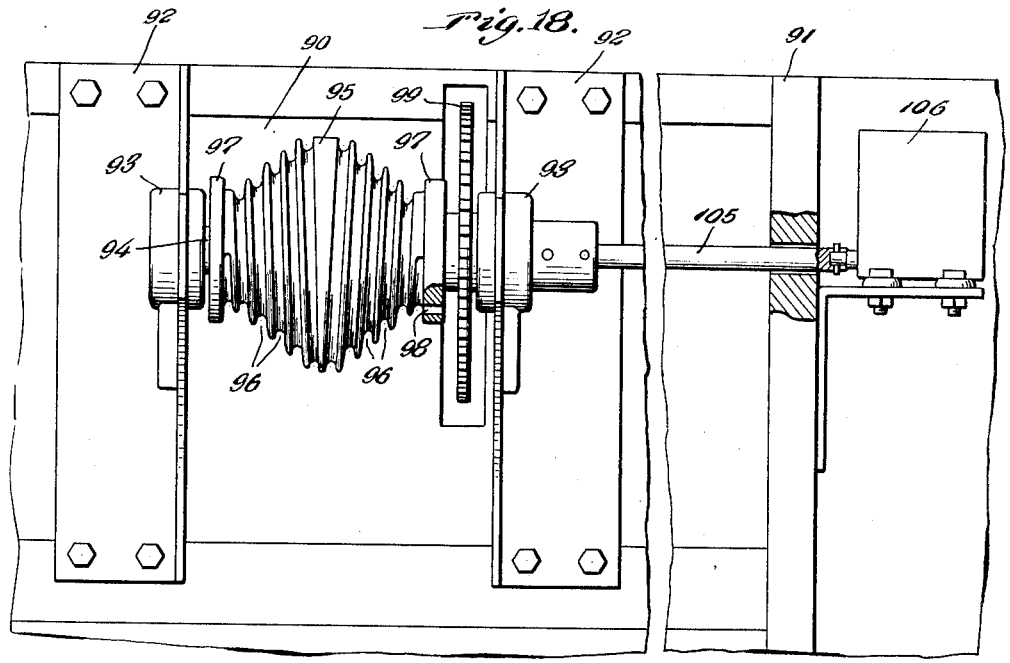
Fig. 18 is an enlarged front view of the door lifting drum and its control switch.

A shaft 105 is connected to shaft 94 and extends (Fig. 18) through the upright 91 to an electrical switching device 106 that automatically breaks the motor circuit when the drum has made the required number of revolutions to fully open the door. Spring bumpers 103, supported by brackets 104, are provided to be engaged by the door as it approaches its full open position.

The switch 80 and the switch 106 are in the electrical circuit for motor 101 which opens the door. This motor 101 is also under the control of a manual switch on the control panel 86 on the front of the cabinet. When switch 80 is held open by locking lug 72, the motor 101 will not operate when the control switch at 86 is operated. Also, after the door reaches its fully open position, the switch 106 will break the motor circuit so that operation of the door opening switch will not further operate motor 101. The switch 106 does not, however, prevent a reversal movement of motor 101 to permit the door to close.

To open the door, the shaft 68 must first be turned by handles 70 to the position to withdraw the locking lugs 72 out of the recesses 76. This not only releases the door so that it may be opened, but also permits the switch 80 to move to its circuit closing position. When the motor switch on panel 86 is then manipulated, the motor 101 will operate and draw the lifting cables upwardly. This will initially move the lever 38 from the position of Fig. 22 to the position of Fig. 23, and in so doing will rotate the arm 33 to exert a camming action which will move the door away from the cabinet. This outward movement of the door, together with the outward movement of lever 38 away from the door, will carry the cables 40 away from the door pivot shaft 20 so that a greater leverage effect will thereafter be had in the further opening movement of the door. As the door moves still further outwardly toward the position shown in dotted lines in Fig. 3, the length of the lever arm will increase and advantage is taken of this in increasing the diameter of the drum 95 toward its mid-part, toward which the cables move as they wind up.

The door will continue to move upwardly until the upper section 16 is nearly upright, at which time the switch 106 will break the motor circuit and stop the motor. In this position, the upper door section will be at rest against the springs 103 and the lower door section will be folded back against the upper door section.

When the motor 101 is reversed, the door will be lowered toward closed position. The final closing movement of the door is by a manual push, and the door is then locked closed by turning the handles 70. The lever 38 is urged to a downward inactive position as in Figs. 1 and 22 by means of springs 107 connected to arms 108 on shaft 32.

The work to be abraded is carried by a conveyor made up of a center section 110 and a plurality of sections hinged to the long sides thereof, this conveyor being oscillatable in order to tumble the work back and forth in opposite directions at the bottom thereof.

The center section 110 is supported by end plates 111 and 112, to which it is rigidly welded. Stub shafts 113 are journaled in pairs of bearings 114, and stub shafts 115 are journaled in pairs of bearings 116 formed on the underside of the center section, and these stub shafts extend into holes 123 (Fig. 11) in the end plates 111, 112. Spaced transverse ribs 126 connect with the longitudinal ribs 125 for strengthening this center section 110.

This center section 110 is formed with inclined sides 127 and 128 so that it is of general trough-like shape, the side 128 being the shortest. The inner face of the center section 110 may be protected against wear by the provision of replaceable wear plates 129, 130, and 131 riveted or otherwise secured thereto. Perforations are arranged in this section 110 and in the wear plates to permit the abrasive to sift through to the abrasive conveyor 120 in the bottom of the cabinet. The wear plate 131 is wider than the underlying inclined portion 127 and its far edge 132 extends to a point to rest on a seat 133 formed on a connecting member 134, when the parts are in the position of Fig. 3. Also, the connecting member 134 has a seat 139 which receives the flange 141 at the edge of portion 127 of the center section. Adjacent the seat 133, the connecting member 134 is provided with a curved outer face 135 which forms a bearing surface for an overlapping edge face 136 of the next section 140 of the conveyor.

The member 134 connects the side section 140 to the center section 110. This member includes a plate portion 137 which is connected to the section 140, and the attached arm portions 138 which are connected to the center section 110. Bolts at 145 connect the arms 138 to the plate portion 137 of member 134. The arms 138 have bores therethrough to receive the stub shafts 115. It is important to here note that the stub shafts 115 are located inwardly of the center section 110 from the edge 132. In the machine illustrated, the stub shafts are adjacent the junction of the side portion 127 and the central portion of the center section 110.

Figure 16:
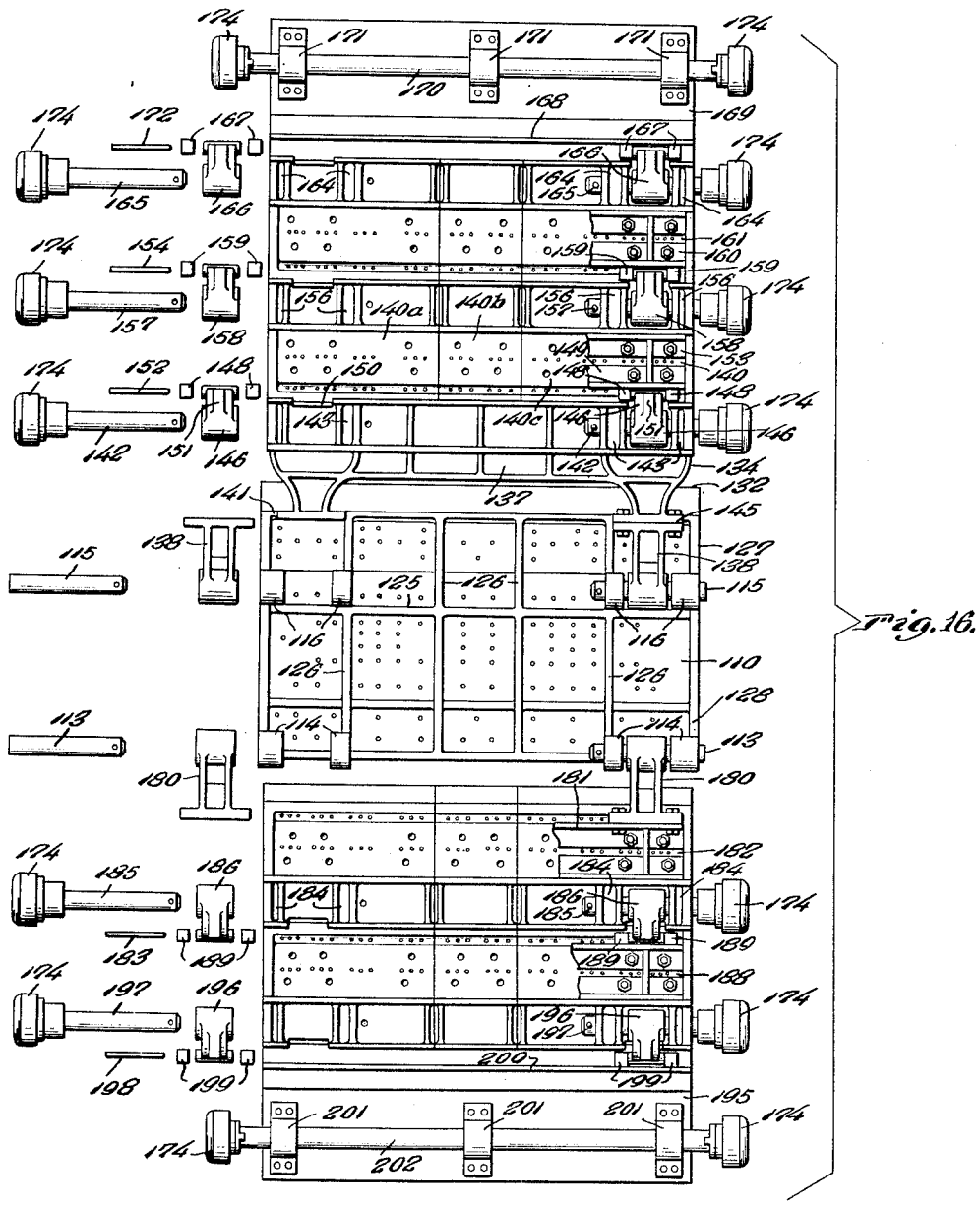
Fig. 16 is a diagrammatic view of the conveyor as it would appear if straightened out, and showing one end in its assembled form, and showing parts at the other end removed to one side.

Beneath the curved face 135 of connecting member 134 are bearings 143. Through the bearings 143 are bore holes, concentric with the curved face 135, to receive stub shafts 142. Links 146 are mounted on stub shafts 142. At their other ends the links 146 are pivotally connected by pins 152 to blocks 148 which are attached to an angle iron 149 secured to the side section 140. To accommodate the links 146, the edge of curved face 135 is notched at 150, as shown in Fig. 16. Lugs 151 are formed on the links 146 for engagement with the angle 149 of the section 140 to limit movement thereof. This provision of links 146, and the location of the axis of the pivot which includes pins 152 in a direction offset toward the work supporting surface of the conveyor from a line joining the axes of the pivotal connections which includes the stub shafts 142 and 157, permits a limited separation between the surfaces 135 and 136 to minimize wear of the surfaces.

The section 140 may be made up of separate pieces 140a, 140b, and 140c in order to complete the full width of the section. The separate pieces are held together by the angle 149 and by the angle 153. The use of these separate pieces makes it possible to readily fabricate a conveyor of smaller width, as by eliminating the middle piece 140b. In such event, the central section 110 would have to be of corresponding lesser width.

The section 140 is provided at its side opposite from 136 with a curved outer face 155 corresponding to the curved face 135 of the connecting member 134. Beneath this curved face 155 are spaced bearings 156 for stud shafts 157, to which links 158 are pivoted. These links 158 are connected by pins 154 to blocks 159 which are secured to angle 160 of the section 161. It should be observed that section 161 is a duplicate of section 140, so that they are interchangeable. Section 161 is also provided with a portion 162 which overlaps the curved outer face 155 of section 140. This connection between sections 140 and 161 is in all respects similar to the connection between section 140 and the connecting member 134.

Section 161 is connected to end section 169 by a joint which is similar to the connection described. This includes links 166 journaled on shaft 165 which passes through the bearings 164 of section 161. The links 166 are also connected by pins 172 to blocks 167 affixed to angle 168, which is welded or otherwise secured to the end section 169. This end section 169 may be a plate which at one end overlaps the curved portion 163 of section 161. Parallel with and near the edge of the end section 169 is a shaft 170 mounted in brackets 171 which are secured to the section 169.

Pivoted to the stub shaft 113 of the center section 110 are arms 180 which are bolted to angles 181 of section 182. It should be noted that stub shaft 113 is near the edge of the center section 110. The section 182 is a duplicate of sections 140 and 161. Against the under surface 175 of section 182 seats a flange 176 of each arm 180 to provide additional support.

The section 182 is connected to the next section 188 in the same manner that sections 140 and 161 are jointed. This includes links 186 mounted on stub shafts 185 which pass through bearings 184 of section 182, and also includes the pins 183 which pass through the other ends of links 186 and also through blocks 189 secured to angle 187 of the section 188. Sections 182 and 188 meet at the curved faces at 190.

The end section 195 is of a construction similar to the end section 169 and is connected to section 188 the same as 169 is connected to section 161. This connection includes links 196, stub shaft 197, pins 198, and blocks 199, which are secured to angle 200 of end section 195. Brackets 201 secured to the end section 195 support the shaft 202.

The shafts 142, 157, 165, and 170 at one side of the center section and shafts 185, 197, and 202 at the other side of the center section, extend beyond the ends of their respective sections and have rollers 174 mounted thereon to run upon a trackway, which will be described.

The work supporting faces of the several sections may be provided with ribs 203 (Fig. 2) for the work to rest on. These ribs 203 support the work away from the perforations through the sections so as not to obstruct the perforations and prevent escape of used abrasive therethrough.

The end supporting plate 111 to which one end of the center section 110 is affixed, has a central bore 210 in which fits a cup-shaped bushing 211 (Fig. 12). This bushing 211 receives a ball bearing 212 which is secured on the reduced extension 213 of the drive shaft 214 by a retaining disc 217. This bearing 212 directly supports the plate 111, but transmits no rotative force from shaft 214 to plate 111. The drive between shaft 214 and plate 111 is through studs 218 which are located at a considerable radial distance outwardly from the axis of shaft 214.

To receive the studs 218, the plate 111 is provided with circumferentially spaced holes 215, in which fit the discs 216. The reduced ends 222 of the studs 218 seat in these discs 216. Screws 219 retain the studs 218 in the discs 216, and also retain the discs 216 in plate 111. An enlarged central portion of the studs 218 extends through rubber sleeves 220, and these rubber sleeves lie in holes 223 formed in the flange 221 of the shaft 214. A reduced portion 225 of studs 218 is seated in holes in a stud supporting ring 224, and the studs are held therein by clamping plates 226 secured to the ends of the studs by bolts 228.

The inner surface of the ring 224 is of stepped formation, and is provided with a packing seal 231 which bears upon the outer surface of the bearing shell 230, and with a like packing seal 229 which bears upon the outside of an annular rib 234 projecting from the flange 221 of the drive shaft. A further packing seal 232 is provided between the inner surface of rib 234 and the bearing sleeve 236 to insure a longer use of the bearings and their races. The shaft 214 turns in anti-friction bearings 235 at its one end and in like bearings at the other end. These bearings are held by the replaceable bearing sleeves 236 and 237 and retainer 238. The bearing shell 230 is secured to the chamber wall 240.

Sprocket 245 mounted on the shaft 214 is driven by suitable power means, as the electric motor drive shown in the application of Hamren, Serial No. 154,105, filed July 16, 1937 now Patent No. 2,254,219. A cap 246 is secured to the end of the shaft 214 and extends through the end wall 248 of the cabinet. The cap 246 is formed with a projection 251 which serves as a pointer to indicate the position of the barrel. For this purpose, the cap 250 may have markings thereon corresponding to the various positions of the barrel, so that when the pointer 251 registers with them, the exact position of the barrel will be known.

The provision of the driving studs 218 affords a means for driving the conveyor, which is of considerable strength. Because of the bearing 212, the studs 218 are entirely relieved of any radial supporting forces for the conveyor, so that the studs must serve only to oscillate the barrel. By locating the studs at a considerable radial distance away from the axis of rotation, the driving force they must exert is relatively small although the torque required for moving the conveyor is great. The rubber sleeves 220 serve to absorb the shocks which arise during the operation of the machine. The retaining ring 224 firmly holds the studs 218 against angular tilting, so that they remain parallel and do not cant within the rubber sleeves 220.

On the inner face of the supporting plate 111 is a plate 260 and next inwardly is a plate 261. The plate 260 is centered by having a central aperture which seats upon the periphery of the flange 262 of the cup-shaped member 211. The screws 219 clamp the central part of plate 260 and the screws 263 clamp both the plate 261 and plate 260 to the supporting plate 111.

The plate 260 is cut away at 265 (Fig. 11) to conform with the shape of the center conveyor section 110 and its inclined side portions 127 and 128. Notches are formed in the periphery of the plate 260 to freely receive the stud shafts of the conveyor when the conveyor sections fold inwardly against this plate. Notches 266, 267, and 268, respectively, receive the shafts 185, 197, and 202, and notches 269, 270, 271, and 272, respectively, receive the shafts 142, 157, 165, and 170. These notches are curved in the direction in which the shafts enter and recede from them.

The periphery of the plate 261 is formed with flat faces which will lie close to and parallel to the faces of the conveyor sections when they are brought toward the plate. This plate 261 serves as a replaceable wear plate. Additional wear plates 279 and 280 are welded concentrically to the plate 261 and also cover the heads of screws 263.

The supporting plate 112 at the idling end of the barrel has a central opening (Fig. 15) which receives a bearing sleeve 286 and thereby centers the plate 112. The plate 112 is secured to the flange 288 of sleeve 286 by means of bolts 287. A retainer 290 at one end, and a retainer 291 at the other end secure bearings 292 in sleeve 286. The bearings 292 are secured upon a shaft 295 by means of retaining plate 293. The shaft 295 is secured in a bracket 297 and is held against rotation by a set screw 296. The bracket 297 is bolted to the wall 298 of the barrel chamber.

On the inner face of plate 112 is a plate 281 which corresponds to the plate 260 appearing in Fig. 11. The wear plate 282 in Fig. 15 corresponds to the wear plate 261 of Fig. 11. These plates 281 and 282 are held to plate 112 by screws 283. Wear plates 284 and 285 of Fig. 15 correspond to wear plates 279 and 280, respectively, of Fig. 12.

The center section 110 is constantly supported by the end plates 111 and 112 by being welded to them. To support the other sections of the conveyor, and to guide them in a definite path, trackways are secured to the end walls 240 and 298 of the chamber. Since the trackways at the two ends are of identical construction, only the one at the driving end of the conveyor is illustrated. This is shown in Figs. 6, 7, 8, and 9.

This trackway is made up of a number of replaceable sections. The lower part of the trackway is made up of arcuate pieces 300 of hexagonal cross-section (Fig. 10). These arcuate pieces 300 are disposed end to end and are concentric with the axes of rotation of the conveyor. They are supported by a shelf-like flange 301 welded to a plate 302 which is secured by suitable means to the end wall 240. Apertures 305 are formed in the lower portion of the flange 301 as shown in Fig. 2, so that any abrasive materials collecting thereon will pass therethrough to the abrasive conveyor below, and will not build up onto the arcuate pieces 300.

Spaced rods 306 (Fig. 10) are welded to the flange 301 and the arcuate pieces 300 are seated between these rods 306 and held against lateral displacement by them. These sections form a complete half circle, and their ends are forced against each other by track sections 308, so that they will be secured rigidly in place. These sections 308 have elongated openings 309 to receive bolts 310 by which they are held to the plate 302. These elongated openings permit the sections 308 to be shifted away from the arcuate pieces 300 so that the latter may be replaced when worn. Welded to the plate 302 in positions which are opposite from sections 308 are arcuate shaped flanges 311 that serve to guide the conveyor rollers 174 into the upper track sections to be described.

Openings 312 in plate 302 register with similar openings in the wall 240 to permit the removal of rollers 174 and their shafts when they are to be replaced or the conveyor is to be dismantled. These openings 312 are normally covered by plates (not shown).

Companion track sections 314 and 315 are secured to the end wall 240 of the cabinet chamber above the plate 302 and are spaced for free travel between them of the conveyor rollers 174. Strengthening ribs are formed on these sections 314, 315 and a clamping bolt 316 is located in the lower rib section 317 as shown in Fig. 3, so that the head of the bolt rests in a notch 313 formed on the upper edge of the section 308. This bolt 316 affords additional adjusting and clamping means.

An arcuate shaped track member 320 adjoining to and aligning with the track sections 314 and 315 is mounted on the top of the cabinet. This track member 320 extends to a sufficient height to accommodate the conveyor in its maximum upward travel. Where the wear is greatest upon this track member, it may be provided with a hard metal insert 318.

Track sections 324 and 325 at the other end of the conveyor's path of movement are secured to the wall 240. The tracks of these sections 324 and 325 are spaced apart to freely receive the rollers 174. An arcuate shaped trackway section 330 adjoining to and having its trackways aligning with the tracks of sections 324 and 325 is also mounted on top of the cabinet to accommodate the conveyor travel in the opposite direction.

When it is desired to replace any of the arcuate pieces 300, it is only necessary to loosen the bolts 316 and 310 and slide the opposing section 308 upward. This relieves clamping action upon the arcuate pieces and any one or all of them may be readily removed. The track sections 308, 314, 315, 324, and 325 may also readily be replaced when they are worn.

The top wall 241 of the abrading chamber supports the abrasive throwing devices 242 (Fig. 2). These devices may be directional control centrifugal blasting machines such as shown in United States Patent No. 2,108,211, issued on February 15, 1938, to Rosenberger et al. The direction control means of these machines should be so oriented that the streams of abrasive are projected downwardly through the openings 243 in the wall 241 and cover the entire width of the conveyor between the end plates 261 and 282.

During normal operation of the barrel, that is, during the movement of the conveyor back and forth so as to tumble the material in first one direction and then in the opposite direction, the central section 110 is oscillated through a constant arc which alternately thrusts the end sections 169 and 195 upwardly into their track sections 329 and 330. This movement will be automatically controlled, as by the means disclosed in the aforesaid application of E. O. Hamren.

When it is desired to discharge the material from the conveyor, the conveyor will be moved to the position shown in Fig. 4, and this will ordinarily be under manual control by means of a switch on panel 86. The connecting member 134 permits movement of the conveyor to this position, this being because the connecting member 134 can fold back upon the fixed central section 110 and permit continued movement of the central section 110 in a counter-clockwise direction, as viewed in Figs. 4 and 5. Fig. 5 shows the separation of arm 134 from the inclined portion 127 of the central section. Continued movement in a counter-clockwise direction will increase this separation until the position of Fig. 4 is reached.

The point of attachment of the stub shaft 115 to the central section 110 is of importance, because the connecting section may be brought against portion 127 and thereby cause the section 140 to lie next to the wear plate 131, as in Fig. 3, to form a continuous conveyor surface, or the connecting section may lie against the central part of the center section as in Fig. 4 to permit continued movement of the conveyor to its discharging position.

After the material has been discharged, the conveyor is moved from the position of Fig. 4 to the position of Fig. 5 in which new material can be placed upon the conveyor. This movement may be under manual control. Thereafter, the conveyor may be set into its automatic back and forth tumbling motion.

I claim:

1. A tumbling barrel comprising a plurality of side by side sections, head plates at opposite ends of a central one of said sections and rigidly secured thereto, means for rotatably supporting said head plates, means between each adjacent section for hingedly connecting them together, the connecting means between said central section and one of its next adjacent sections including a member pivoted to the central member at a point inwardly from the edge of the central member which is juxtaposed to said next adjacent section, means for oscillating said heads and affixed central section, and means for guiding the end sections in a generally trough shaped path during said oscillations.

2. A tumbling barrel according to claim 1 in which said central section is of trough-like shape facing toward the axis of rotation of said heads.

3. A tumbling barrel according to claim 1 in which said connecting member has seat means against which the central section may rest.

4. A tumbling barrel according to claim 1 in which said connecting member and said next adjacent member have cooperating curved surfaces which serve to prevent escape of material between them.

5. A tumbling barrel comprising a plurality of side by side sections including a central section having portions inclined with respect to each other, head plates at opposite ends of said central section and rigidly secured thereto, means for rotatably supporting said head plates, means between each adjacent section for hingedly connecting them together, the connecting means between said central section and one of its next adjacent sections including a member pivoted to the central member at a point adjacent the junction of the inclined portions thereof, means for oscillating said heads and affixed central section, and means for guiding the end sections in a generally trough shaped path during said oscillations.

6. A tumbling barrel according to claim 5 in which said connecting member is longer than the overlying portion of the central section.

7. A machine for handling articles to be tumbled comprising a tumbling barrel having head end plates, means for rotatably supporting one of said head end plates, and means for rotatably supporting and driving the other head end plate including a rotatably mounted drive shaft, a bearing rotatably supporting said drive shaft, another bearing between said drive shaft and said driven plate permitting relative rotative movement between them and sustaining radial loads of the driven plate, and means extending between the driven plate and the shaft at a remote distance from the axis of their rotation to establish a driving connection between them.

8. A machine according to claim 7 in which resilient means is interposed in said driving means to absorb shocks.

9. A machine according to claim 7 in which said drive shaft includes a flanged enlargement and said connecting means engage the flanged enlargement near the periphery thereof.

10. A machine for handling articles to be tumbled comprising a tumbling barrel having head end plates, means for rotatably supporting one of said plates, and means for rotatably supporting and driving the other plate including a rotatably mounted drive shaft, a bearing between said drive shaft and said driven plate permitting their relative rotative movement and sustaining radial loads of the driven plate, said drive shaft having a flanged enlargement opposing said driven plate and having openings therethrough near its periphery, studs extending through said openings and connected to said driven plate to drive the latter, and resilient material between said studs and the walls of said openings to absorb operating shocks.

11. A machine according to claim 10 including a member rigidly connecting together said studs.

12. A tumbling barrel comprising a conveyor made up of a plurality of side-by-side sections hingedly joined together, means for moving the conveyor back and forth in a trough shaped path with its work supporting surface facing inwardly of the trough, the hinged joint between an adjacent pair of said sections including a pivotal connection at corresponding sides of said pair, a link having one end joined to the pivtal connection of one section of said pair, a pivot between the other end of said link and the contiguous side of the other section of said pair, said pivot having its axis offset in a direction toward the work supporting surface of the conveyor from the line joining the axes of said pivotal connections.

ERIC O. HAMREN.